(12) United States Patent
Segawa et al.

(10) Patent No.: US 8,830,409 B2
(45) Date of Patent: Sep. 9, 2014

(54) LIQUID CRYSTAL DISPLAY DEVICE HAVING IMPROVED ELECTROSTATIC DISCHARGE RESISTANCE

(75) Inventors: Yasuo Segawa, Kitagata-cho (JP); Masaaki Aota, Ogaki (JP); Tomohide Onogi, Anparhi-cho (JP); Hiroshi Matsuda, Gifu (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 819 days.

(21) Appl. No.: 12/003,455

(22) Filed: Dec. 26, 2007

(65) Prior Publication Data

US 2008/0158453 A1  Jul. 3, 2008

(30) Foreign Application Priority Data

Dec. 27, 2006 (JP) .................. 2006-352377

(51) Int. Cl.
  G02F 1/133  (2006.01)
  G02F 1/1333 (2006.01)
  G02F 1/1345 (2006.01)
  G02F 1/1362 (2006.01)

(52) U.S. Cl.
  CPC ...... *G02F 1/136204* (2013.01); *G02F 1/13452* (2013.01); *G02F 2202/22* (2013.01)
  USPC .............................. 349/40; 349/34

(58) Field of Classification Search
  USPC ............................. 349/141, 34, 40
  See application file for complete search history.

(56) References Cited

U.S. PATENT DOCUMENTS

| | | | | |
|---|---|---|---|---|
| 5,953,092 A * | 9/1999 | Sung et al. | ..... | 349/143 |
| 6,143,418 A | 11/2000 | Takamiya et al. | | |
| 6,259,502 B1 * | 7/2001 | Komatsu | ..... | 349/141 |
| 6,346,932 B1 | 2/2002 | Maeda | | |
| 6,441,876 B1 * | 8/2002 | Wada et al. | ..... | 349/111 |
| 6,473,067 B2 | 10/2002 | Maeda | | |
| 6,597,414 B1 * | 7/2003 | Hasegawa | ..... | 349/40 |
| 6,657,608 B2 | 12/2003 | Maeda | | |
| 7,460,203 B2 * | 12/2008 | Kim | ..... | 349/149 |
| 2002/0126231 A1 * | 9/2002 | Zhang et al. | ..... | 349/40 |
| 2003/0218593 A1 * | 11/2003 | Inoue et al. | ..... | 345/92 |
| 2005/0082969 A1 * | 4/2005 | Tokuda et al. | ..... | 313/506 |
| 2005/0230757 A1 * | 10/2005 | Nagasawa et al. | ..... | 257/355 |

FOREIGN PATENT DOCUMENTS

| | | |
|---|---|---|
| CN | 1198835 A | 11/1998 |
| JP | U-7-41586 | 7/1995 |
| JP | A 09-105918 | 4/1997 |
| JP | A-10-268278 | 10/1998 |
| JP | A-11-282011 | 10/1999 |
| JP | A-2001-21918 | 1/2001 |
| JP | A-2004-4754 | 1/2004 |
| JP | A-2005-3816 | 1/2005 |

* cited by examiner

Primary Examiner — Hoan C Nguyen

(74) Attorney, Agent, or Firm — K&L Gates LLP

(57) ABSTRACT

A liquid crystal display device includes a first substrate, a second substrate and liquid crystal. The first substrate includes pixel electrodes, a peripheral circuit and a dummy wiring. The peripheral circuit and the dummy wiring are provided outside a pixel area in which the pixel electrodes are arranged. The second substrate is opposed to the first substrate through the liquid crystal. The second substrate includes a translucent conductive film that is provided on an opposite side of the second substrate to a side where the liquid crystal is present. The dummy wiring is located on an outer peripheral side of the substrates than the peripheral circuit and is provided independently of the peripheral circuit in terms of circuit. The dummy wiring is grounded outside the first substrate.

9 Claims, 6 Drawing Sheets

LIQUID CRYSTAL DISPLAY DEVICE HAVING IMPROVED ELECTROSTATIC DISCHARGE RESISTANCE

BACKGROUND

1. Technical Field

The present invention relates to a liquid crystal display device and, more particularly, to improvement in electrostatic discharge resistance of a liquid crystal display device.

2. Related Art

In a FFS (Fringe Field Switching) mode liquid crystal panel, a pixel electrode and a common electrode, which control the alignment of liquid crystal, both are provided in an element substrate, and these two electrodes are laminated through an insulating film. Of these electrodes, an upper layer electrode is provided with slits. A rubbing process is treated in a direction that is substantially parallel to a long side direction of the slits. When the electric potential between the electrodes is an off potential, liquid crystal molecules are aligned in a direction that is perpendicular to the long side direction of the slits. When an electric potential higher than the off potential is applied between the electrodes, an electric field (horizontal electric field) is generated in a direction perpendicular to the long sides of the slits, and liquid crystal molecules are rotated (horizontally rotated) in a plane parallel to the substrate along the direction of the electric field. By controlling the rotation angle of the liquid crystal molecules, the amount of light transmission is controlled.

Note that, in addition to the FFS mode, an IPS (In-Plane Switching) mode is known as a configuration in which both the pixel electrode and the common electrode are provided in the element substrate.

Liquid crystal panels have been progressively reduced in size, thickness, and window frame width, and progressively added with functions, such as a touch panel. In accordance with the above, static electricity from the outside of the panels through a human body, or the like, may cause a trouble in the panels.

For example, in the FFS mode, and the like, when an opposite substrate, which is opposed to an element substrate, is applied with static electricity and is electrostatically charged, there is a possibility that a vertical electric field is generated by the electrostatic charge and, hence, an appropriate alignment control on the liquid crystal using the electrodes provided in the element substrate cannot be performed. In this case, for example, in a normally black liquid crystal panel, a black display becomes whitish and the contrast is decreased. In addition, when a degree of whitish display is not uniform over the entire screen, display chrominance non-uniformity is observed.

As one of countermeasures to the above, there is a manner in which a translucent conductive film is formed over the entire outer surface of the opposite substrate, and this translucent conductive film is connected to a case or an FPC (Flexible Printed Circuit) terminal, thus releasing the electrostatic charge to the ground electric potential (GND) of an external circuit, which is described in Japanese Unexamined Patent Application Publication No. 9-105918.

Even with the above countermeasure, however, it has been found that there is a possibility that a sufficient electrostatic discharge resistance cannot be obtained.

SUMMARY

An advantage of some aspects of the invention is that it provides a liquid crystal display device that improves electrostatic discharge resistance.

A first aspect of the invention provides a liquid crystal display device. The liquid crystal display device includes a first substrate, a second substrate and liquid crystal. The first substrate includes pixel electrodes, a peripheral circuit and a dummy wiring. The peripheral circuit and the dummy wiring are provided outside a pixel area in which the pixel electrodes are arranged. The second substrate is opposed to the first substrate through the liquid crystal. The second substrate includes a translucent conductive film that is provided on an opposite side of the second substrate to a side where the liquid crystal is present. The dummy wiring is located on an outer peripheral side of the substrates than the peripheral circuit and is provided independently of the peripheral circuit in terms of circuit. The dummy wiring is grounded outside the first substrate.

A second aspect of the invention provides a liquid crystal display device. The liquid crystal display device includes a first substrate, a second substrate and liquid crystal. The first substrate includes pixel electrodes, a peripheral circuit and a dummy wiring. The peripheral circuit and the dummy wiring are provided outside a pixel area in which the pixel electrodes are arranged. The second substrate is opposed to the first substrate through the liquid crystal. The second substrate includes a translucent conductive film that is provided on an opposite side of the second substrate to a side where the liquid crystal is present. The dummy wiring is connected to a power supply wiring through a protective resistance.

A third aspect of the invention provides a liquid crystal display device. The liquid crystal display device includes a first substrate, a second substrate and liquid crystal. The first substrate includes pixel electrodes and a peripheral circuit. The peripheral circuit is provided outside a pixel area in which the pixel electrodes are arranged. The second substrate is opposed to the first-substrate through the liquid crystal. The second substrate includes a translucent conductive film that is provided on an opposite side of the second substrate to a side where the liquid crystal is present. The peripheral circuit includes a power supply wiring that is connected to a control terminal of a circuit element through a protective resistance.

Here, the first substrate may further include at least one common electrode, wherein the translucent conductive film is maintained at a predetermined electric potential.

BRIEF DESCRIPTION OF THE DRAWINGS

The invention will be described with reference to the accompanying drawings, wherein like numbers reference like elements.

DESCRIPTION OF EXEMPLARY EMBODIMENTS

Before describing embodiments according to the invention, electrostatic discharge resistance has been considered on the basis of various evaluations. This will be described with reference to FIG. 6 and FIG. 7 illustrating the cross-sectional views around peripheral portions of a liquid crystal display device.

Figure 6:
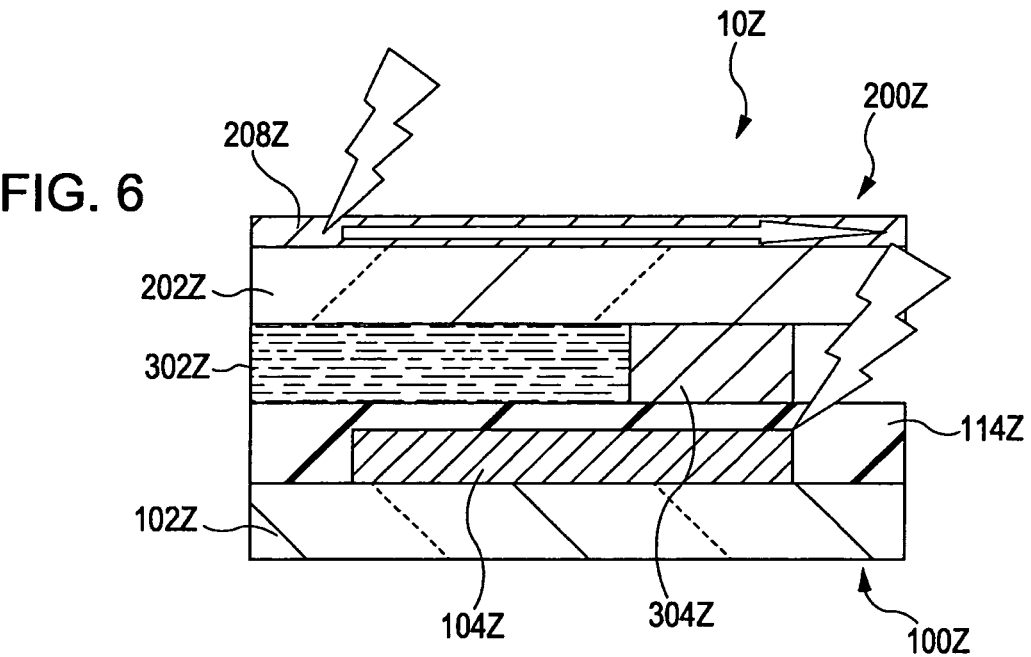
FIG. 6 is a cross-sectional view that illustrates an influence of static electricity according to an existing FFS mode liquid crystal display device.
Figure 7:
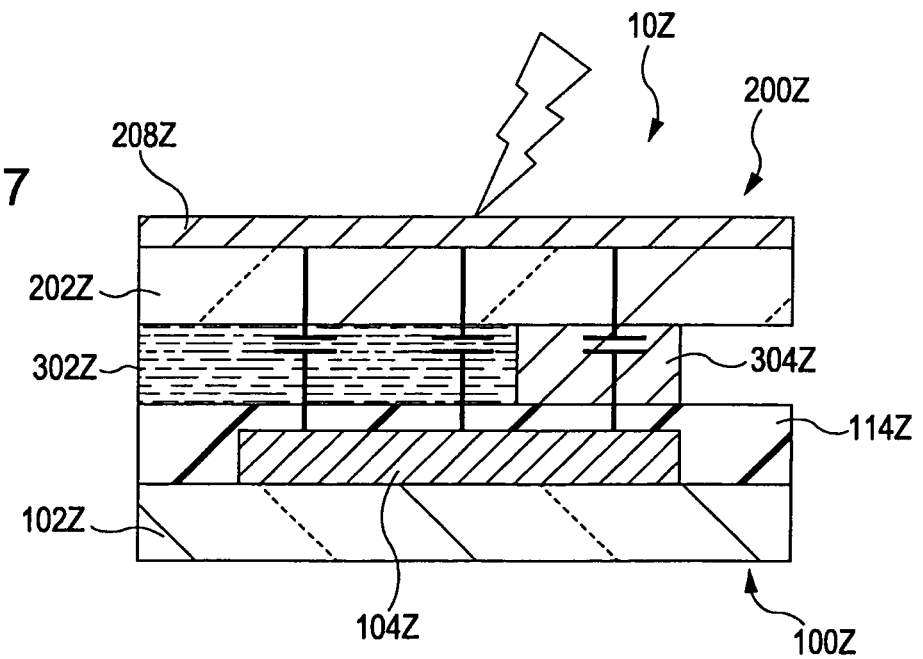
FIG. 7 is a cross-sectional view that illustrates an influence of static electricity according to an existing FFS mode liquid crystal display device.

As shown in FIG. 6 and FIG. 7, in an existing FFS mode liquid crystal display device 10Z, a first substrate 100Z and a second substrate 200Z are adhered to each other by a seal 304Z, and liquid crystal 302Z is held between these substrates 100Z, 200Z. A circuit wiring group 104Z is arranged on a support substrate 102Z of the first substrate 100Z, and an insulating film 114Z is arranged so as to cover the circuit wiring group 104Z. Note that the circuit wiring group 104Z is schematically shown in the drawing. A translucent conductive film 208Z is arranged on an outer surface of a support substrate 202Z of the second substrate 200Z, and this translucent conductive film 208Z extends over the entire surface of the above outer surface, that is, to the outer periphery of the support substrate 202Z, that is, to the outer periphery of the second substrate 200Z. Note that, for example, by forming the translucent conductive film 208Z over the entire surface of a substrate, which includes multiple number of unit substrates, and then separating the substrate into the unit substrates, the translucent conductive film 208Z is formed so as to extend to the outer periphery of the second substrate 200Z.

When aerial discharge has been performed on the translucent conductive film 208Z, aerial discharge that is generated at the outer peripheral portion of the translucent conductive film 208Z, as shown in FIG. 6, was observed, and breakage was found in the circuit wiring group 104Z and circuit elements connected thereto. According to the above, it is conceivable that static electricity is transmitted from the outer peripheral portion of the translucent conductive film 208Z through the side of the outer peripheral portion of the second substrate 200Z to the circuit wiring group 104Z. In this case, of the circuit wiring group 104Z, static electricity tends to be transmitted to a circuit wiring closer to the outer periphery of the substrate.

In addition, breakage also found in a circuit wiring remote from the outer periphery of the substrate and circuit elements connected thereto. It is conceivable that this breakage occurs because the electric potential of the translucent conductive film 208Z rises due to static electricity that has entered the translucent conductive film 208Z, and then the electric potential of the circuit wiring group 104Z rises due to coupling with the electric potential rise of the translucent conductive film 208Z. That is, it is conceivable that the breakage occurs due to the transmission of static electricity on the basis of coupling (see FIG. 7). Note that FIG. 7 is a schematic view illustrating a state of coupling using the graphic symbols of capacitors. The coupling with the translucent conductive film 208Z tends to occur as the area of wiring pattern is increased, that is, the width and/or length, or the like, of wiring is increased. It is conceivable that, for example, the coupling tends to occur with a power supply wiring that has a wide line width for reducing a resistance.

In addition, it has been found that breakage tends to occur more likely in the circuit wiring that extends along the outer periphery of the substrate than in the circuit wiring that extends in a direction which intersects with the outer periphery of the substrate.

Figure 1:
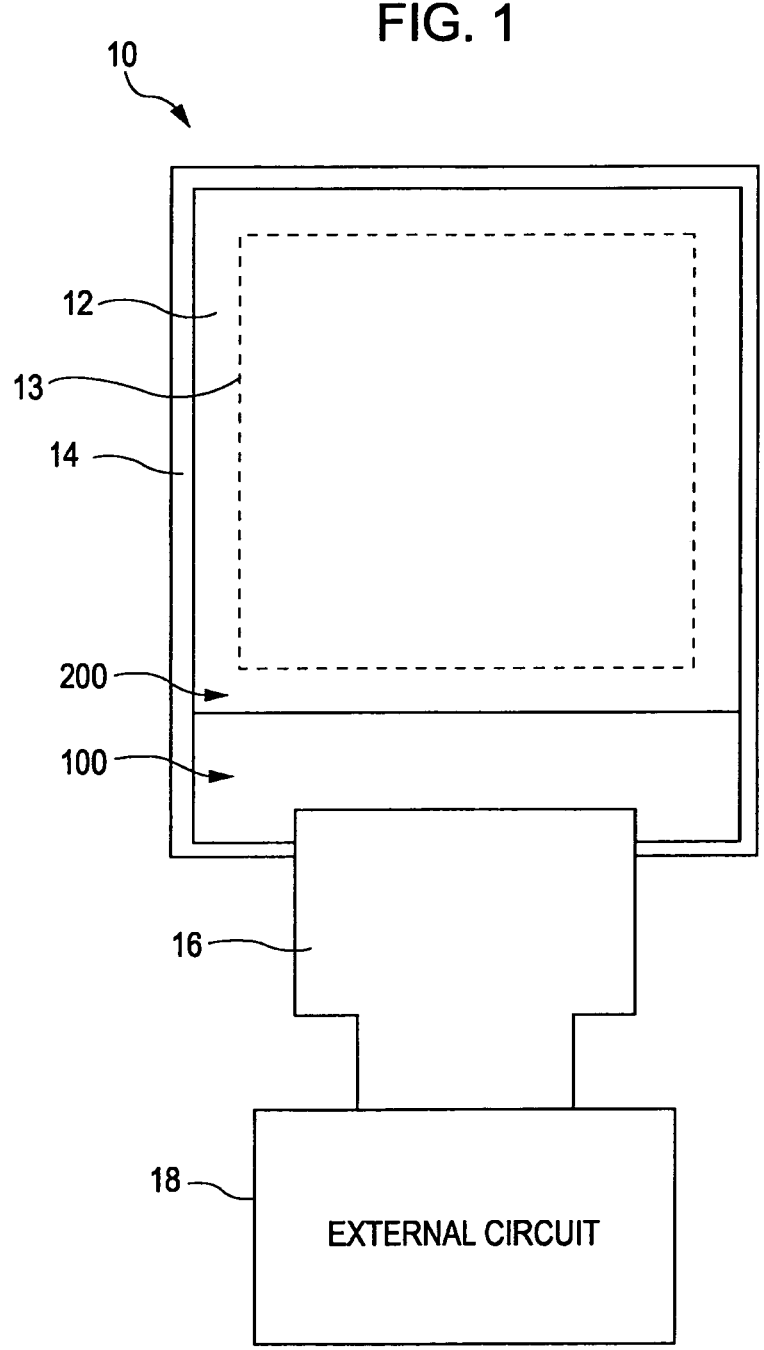
FIG. 1 is a schematic view of a liquid crystal display device according to an embodiment of the invention.

An embodiment according to the invention will now be described with reference to the accompanying drawings. FIG. 1 is a schematic view of a liquid crystal display device 10 according to the embodiment. Note that, for easily understanding the drawings, components that are shown in FIG. 1 and in the following drawings, when they are shown in the other drawings as well, are partially omitted.

As shown in FIG. 1, the liquid crystal display device 10 is configured to include a liquid crystal panel 12, a case 14 for the liquid crystal panel 12, an FPC 16, and an external circuit 18. The liquid crystal panel 12 is connected to the external circuit 18 through the FPC 16. In place of the FPC 16, various wiring bodies may be used. The following will exemplify a case where the liquid crystal panel 12 uses an FFS mode. Note that the liquid crystal panel 12 may be any one of a transmissive type liquid crystal panel, a reflective type liquid crystal panel and a transflective type liquid crystal panel.

Figure 2:
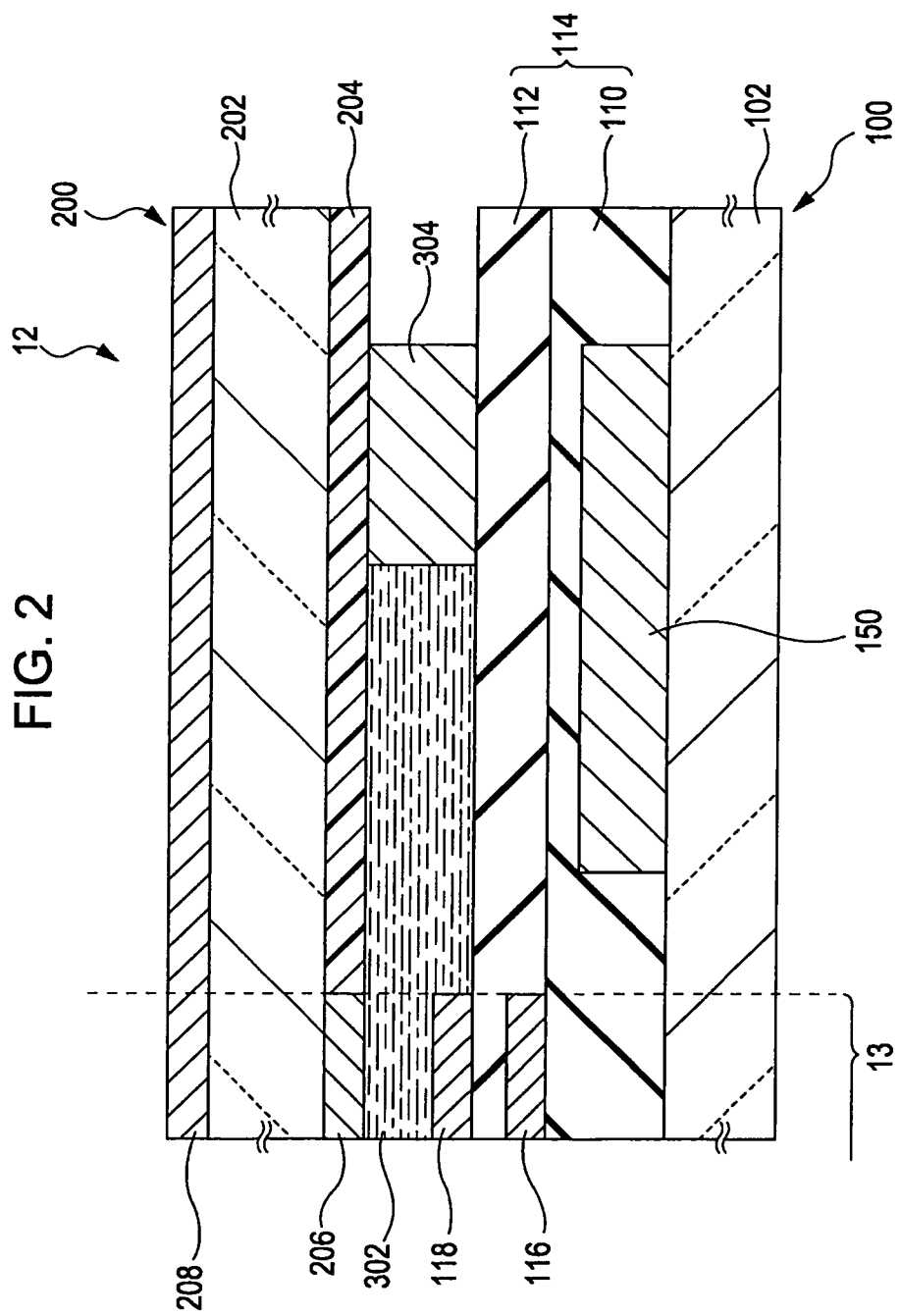
FIG. 2 is a cross-sectional view of a liquid crystal panel according to the embodiment of the invention.

FIG. 2 is a cross-sectional view around an outer periphery of the liquid crystal panel 12. The liquid crystal panel 12 is configured to include a first substrate 100, a second substrate 200, liquid crystal 302 and a seal 304. The substrates 100, 200 are opposed to each other with a predetermined gap formed therebetween, and are adhered to each other at the peripheral portions by the seal 304. The liquid crystal 302 is held in a casing that is formed of the substrates 100, 200 and the seal 304.

The first substrate 100 includes a support substrate 102 that is, for example, formed of a translucent substrate, such as glass, and is configured to include, on the inner surface side of the support substrate 102, that is, on the side adjacent to the liquid crystal 302, insulating films 110, 112, at least one common electrode 116, pixel electrodes 118, a peripheral circuit 150, and an alignment layer (not shown).

The common electrode 116 and the pixel electrodes 118 are paired electrodes that control the alignment of the liquid crystal 302, that is, that drive the liquid crystal 302. The common electrode 116 is commonly provided for a plurality of pixels, and each of the pixel electrodes 118 is provided for each of the pixels. An electric potential corresponding to a display of each pixel is supplied to the pixel electrode 118. Note that it may also be configured that the common electrode 116 is provided for each of the pixels and then a common electric potential is supplied to the common electrode 116. That is, the plurality of pixels are formed of the plurality of pixel electrodes 118 and the at least one common electrode 116. Note that the outermost pixels, arranged all around, or more number of pixels, may possibly be used as dummy pixels that do not directly contribute to image display.

In the FFS mode liquid crystal panel 12, the electrodes 116, 118 both are provided in the first substrate 100, and the electrodes 116, 118 are laminated through the insulating film 112. The following will exemplify a case where the pixel electrodes 118 are arranged in an upper side layer, that is, on the side adjacent to the liquid crystal 302; however, the common electrodes 116 may be arranged in the upper side layer. Slits (not shown) are formed in each of the upper layer pixel electrodes 118, and the alignment of the liquid crystal 302 is controlled by an electric field generated between the electrodes 116, 118 through the slits. The electrodes 116, 118 are, for example, formed of a translucent conductive film, such as ITO (Indium Tin Oxide).

The peripheral circuit 150 is a circuit that is arranged outside the electrodes 116, 118 and the pixel area 13. Here, the pixel area 13 is an area in which a plurality of the pixels are arranged. In other words, the plurality of pixels are arranged in the pixel area 13. Note that an area for the dummy pixels also included in the pixel area 13. The peripheral circuit 150 will be exemplified later.

The insulating films 110, 112 are, for example, formed of silicon oxide, silicon nitride, or the like, and are laminated on the support substrate 102. Note that, for easy description, it exemplifies a case where the insulating film 110 is located in a layer lower than the common electrode 116, that is, the layer adjacent to the support substrate 102, and the insulating film 112 is laminated on the insulating film 110; however, these insulating films 110, 112 are collectively called as an insulating film 114. The insulating films 110, 112 each may be a monolayer film or may be a multilayer film. The alignment layer (not shown) is arranged to cover the pixel electrodes 118, and the alignment layer is treated with a rubbing process.

Note that FIG. 2 exemplifies a case where the peripheral circuit 150 is in contact with the support substrate 102 and is covered with the insulating film 110; however, it may be configured so that the peripheral circuit 150 is embedded in the insulating film 114 formed of a multilayer film and is not in contact with the support substrate 102.

The second substrate 200 includes a support substrate 202 that is, for example, formed of a translucent substrate, such as glass, and is configured to include, on the inner surface side of the support substrate 202, that is, on the side adjacent to the liquid crystal 302, a light shielding film 204, a color filter 206 and an alignment layer (not shown) and to include, on the outer surface side of the support substrate 202, that is, on the side opposite to the liquid crystal 302, a translucent conductive film 208.

The support substrate 202 is opposed to the first substrate 100, and has a size to be opposed to be opposed to the electrodes 116, 118 and the peripheral circuit 150. The light shielding film 204 is arranged on the support substrate 202. The light shielding film 204 extends over the entire surface on the support substrate 202 and has an opening at a position opposite each of the pixel electrodes 118. Note that no opening is provided at a position opposite each of the dummy pixels. The light shielding film 204 is, for example, formed a resin, or the like, containing black pigment. The color filter 206 is arranged on the support substrate 202 and is provided in each opening portion of the light shielding film 204 so as to be opposed to the electrodes 116, 118. The alignment layer (not shown) is arranged to cover the light shielding film 204 and the color filter 206, and the alignment layer is treated with a rubbing process.

The translucent conductive film 208 is arranged on the outer surface of the support substrate 202 and is opposed to the liquid crystal 302 and the electrodes 116, 118, and the like, through the substrate 202. That is, the translucent conductive film 208 is provided in the second substrate 200 and is located on an opposite side to a surface that is in contact with the liquid crystal 302. The translucent conductive film 208 is maintained at an arbitrarily predetermined electric potential, for example, a ground electric potential, and releases static electricity, which enters from the outside of the panel toward the second substrate 200, thus preventing electrostatic charge of the second substrate 200. That is, the translucent conductive film 208 serves as a shielding film. Thus, it is possible to suppress a trouble due to electrostatic charge of the second substrate 200, that is, for example, a decrease in contrast and chrominance non-uniformity. The translucent conductive film 208 may be provided without patterning (without any gaps), or, as long as the body portion 208a achieves a shielding effect against static electricity, it may be patterned to form a mesh.

The translucent conductive film 208 is, for example, formed of ITO, or the like, and may be formed of any one of an inorganic material or an organic material. The translucent conductive film 208 may be formed by a process, such as a sputtering process, a plasma CVD (Chemical Vapor Deposition) process, a spin coating process, and a printing process. The translucent conductive film 208 has a resistivity (sheet resistance) of, for example, 105Ω/□, which is preferably as low as possible. Note that it exemplifies a case where the outer periphery of the translucent conductive film 208 extends to the outer periphery of the support substrate 202, that is, to the outer periphery of the second substrate 200; however, an area, in which the translucent conductive film 208 is arranged, is not limited to this.

Figure 3:
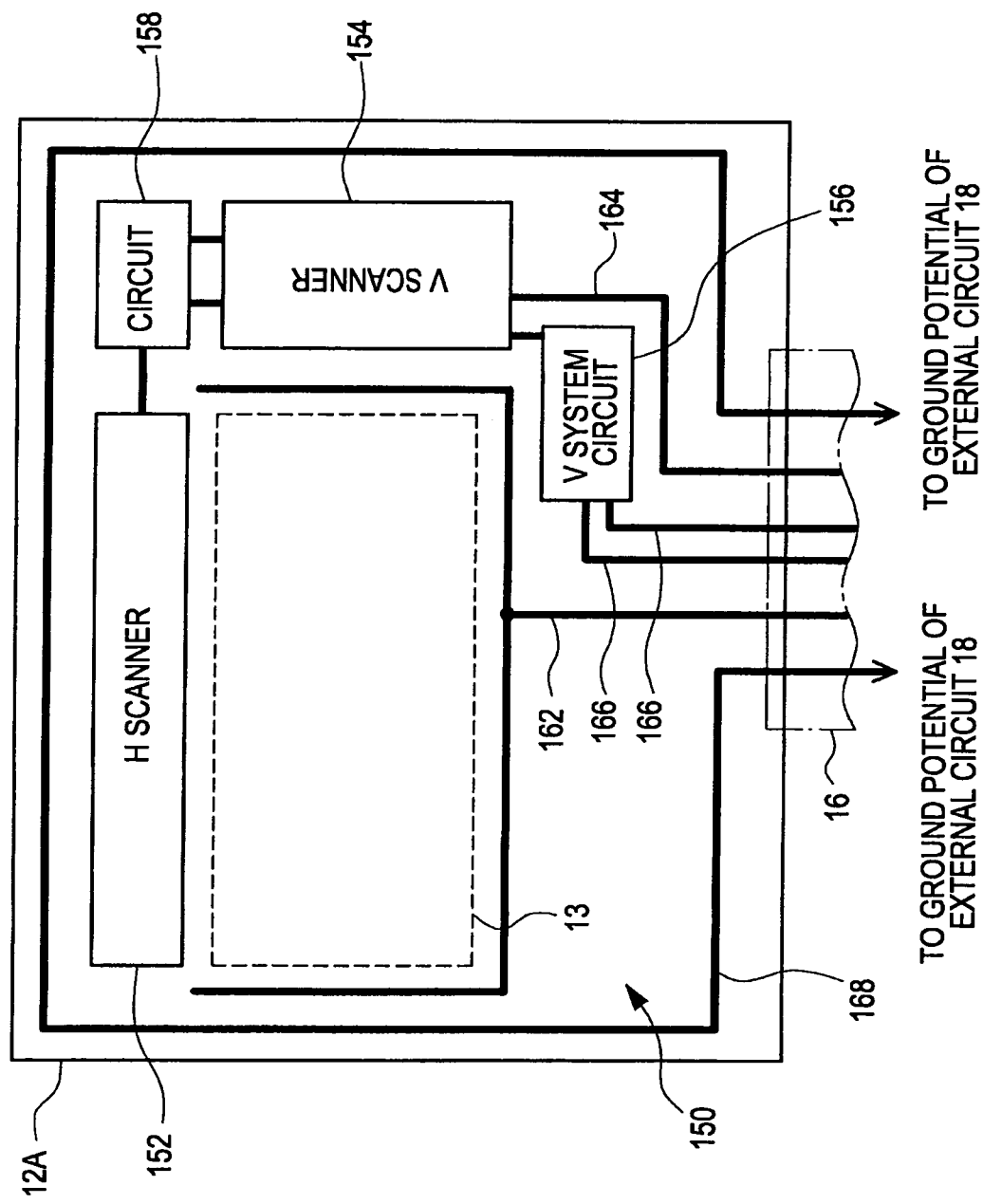
FIG. 3 is a plan view that illustrates a first example of the liquid crystal panel according to the embodiment of the invention.
Figure 4:
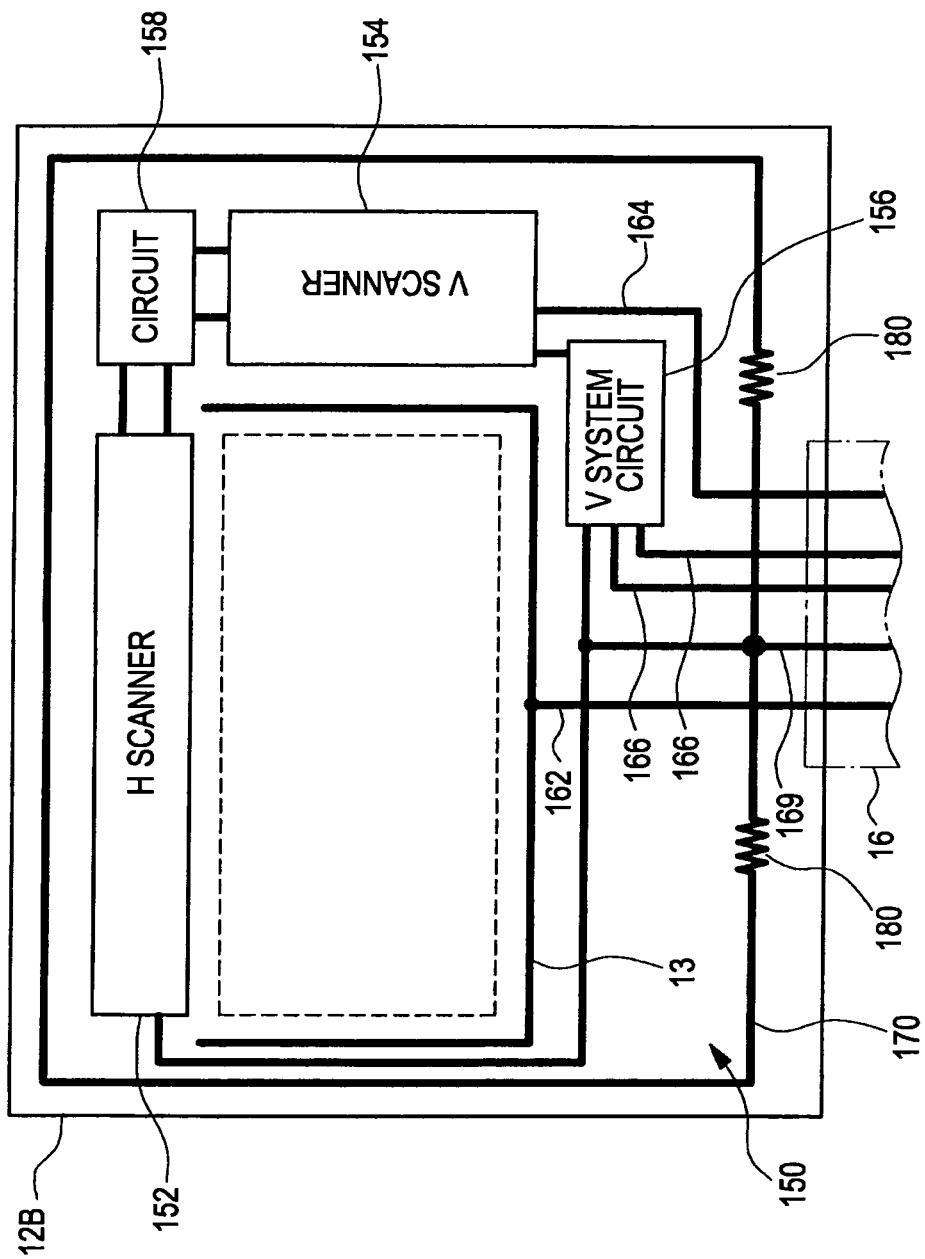
FIG. 4 is a plan view that illustrates a second example of the liquid crystal panel according to the embodiment of the invention.
Figure 5:
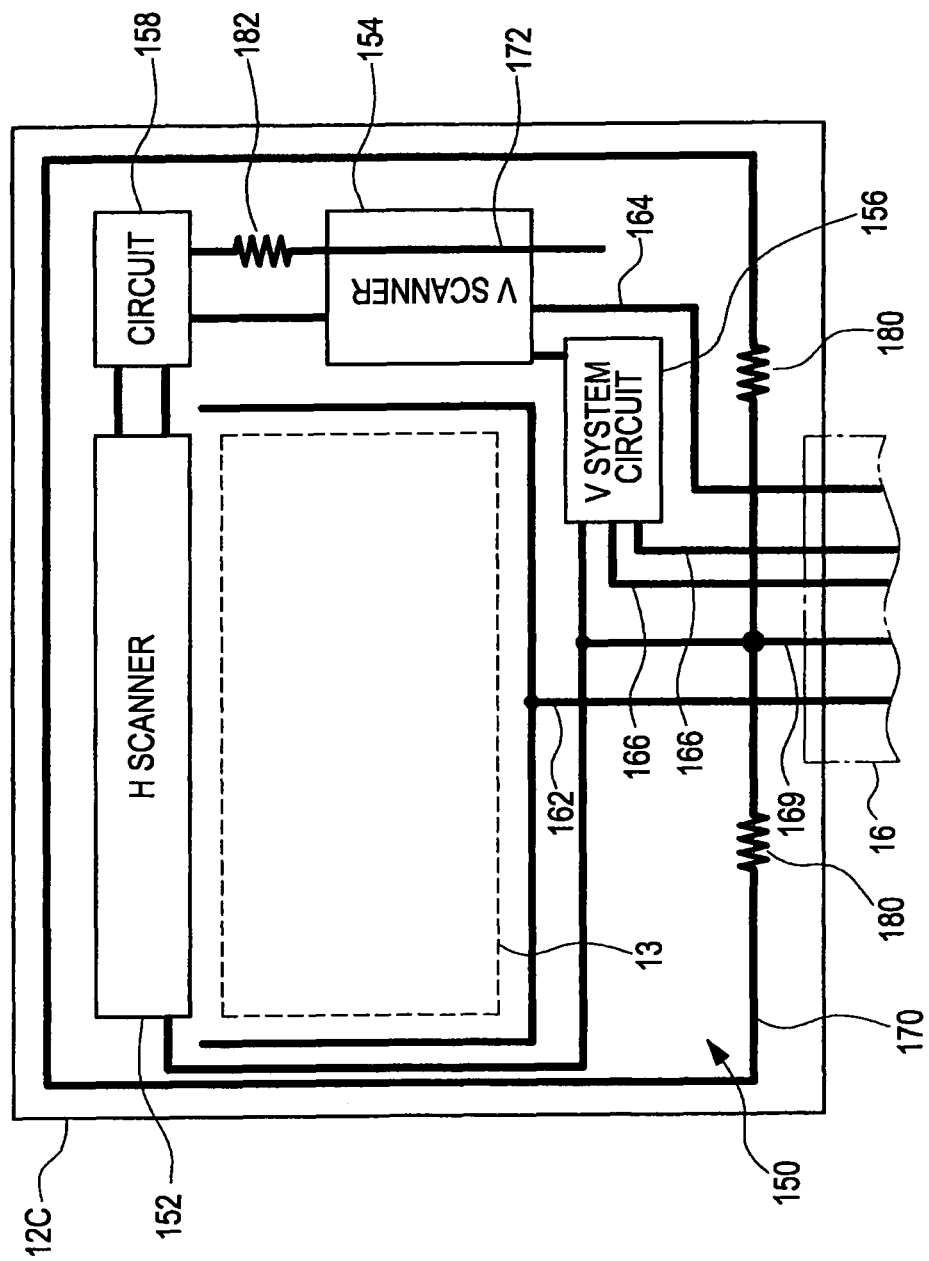
FIG. 5 is a plan view that illustrates a third example of the liquid crystal panel according to the embodiment of the invention.

The liquid crystal panel 12 will now be exemplified. FIG. 3 to FIG. 5 are plan views that illustrate liquid crystal panels 12A to 12C according to first example to third example. Note that, for avoiding complicated drawing, an area outside the pixel area 13 is shown wide, and a connection state, or the like, of a wiring is partially omitted from the drawing.

In the liquid crystal panel 12A that is exemplified in FIG. 3, the peripheral circuit 150 is configured to include an H scanner 152, a V scanner 154, a V system circuit 156, a circuit 158, a COM wiring 162, wirings 164, 166, and the like.

The H scanner 152 and the V scanner 154 are circuits for scanning pixels horizontally and vertically on a display screen. The V system circuit 156 is, for example, a level shifter, and is connected to the V scanner 154. The circuit 158 is, for example, a control circuit, a signal processing circuit, a detection circuit, and the like. Here, the circuit 158 is connected to the scanners 152, 154. The COM wiring 162 is a wiring that supplies an electric potential (common electric potential) to be applied to the common electrode 116 (see FIG. 2). The COM wiring 162 extends from the end, which is connected to the FPC 16, toward the pixel area 13. Here, the COM wiring 162 extends from a portion near the pixel area 13 along three sides of the area 13. The wiring 164 is a control signal wiring for the V scanner 154 and extends from the end, which is connected to the FPC 16, toward the V scanner 154. The wiring 166 is, for example, an input signal wiring to the V system circuit 156 and extends from the end, which is connected to the FPC 16, toward the V system circuit 156. Note that FIG. 3 exemplifies a case where the two wirings 166 are provided.

The liquid crystal panel 12A includes a dummy wiring 168 outside the pixel area 13. The dummy wiring 168 is arranged on the outer peripheral side of the substrate than the peripheral circuit 150 that is configured to include the scanners 152, 154, and the like. The dummy wiring 168 is a wiring that is located on the outermost periphery among various wirings of the liquid crystal panel 12A. In addition, the dummy wiring 168 is not connected to the peripheral circuit 150, that is, the dummy wiring 168 is provided independently of the peripheral circuit 150 in terms of circuit. According to the above arrangement and connection state, the dummy wiring 168 does not intersect with the peripheral circuit 150. The dummy wiring 168 surrounds the peripheral circuit 150. The dummy wiring 168 preferably avoids an intersection with the peripheral circuit 150 also at a portion connected to the FPC 16. In this case, the dummy wiring 168 does not constitute a closed path (closed loop) within the liquid crystal panel 12A, and both ends of the dummy wiring 168 are pulled out to the portion connected to the FPC 16. Both end portions of the dummy wiring 168 are connected through the FPC 16 to the ground electric potential of the external circuit 18. Both end portions of the dummy wiring 168 may be connected to the ground electric potential through a resistance of 10 kΩ to 1 MΩ.

According to the above configuration, even when static electricity enters from the outer peripheral portion of the translucent conductive film 208 over the side face of the support substrate 202 to the first substrate 100, it is possible to flow the static electricity through the dummy wiring 168 to the ground electric potential of the external circuit 18. Thus, it is possible to suppress transmission of static electricity to the peripheral circuit 150, and electrostatic discharge resistance is improved.

The dummy wiring 168 does not intersect with the peripheral circuit 150. For this reason, static electricity entering the dummy wiring 168 is suppressed from being transmitted to the peripheral circuit 150 due to coupling. Thus, electrostatic discharge resistance is improved.

Because the dummy wiring 168 is connected to the ground electric potential of the external circuit 18, the ground electric potential may possibly rise when static electricity enters the dummy wiring 168. However, in terms of a signal, a power supply electric potential, or the like, to which a voltage value is set relatively to the ground electric potential as a reference, an influence of a rise in ground electric potential is suppressed. Therefore, electrostatic discharge resistance is improved in comparison with a case where the dummy wiring 168 is, for example, connected to the ground electric potential of the liquid crystal panel 12A.

In the liquid crystal panel 12B as exemplified in FIG. 4, the peripheral circuit 150 is configured to include the H scanner 152, the V scanner 154, the V system circuit 156, the circuit 158, the COM wiring 162, the wirings 164, 166, a power supply wiring 169, and the like. In addition, the liquid crystal panel 12B includes a dummy wiring 170 and protective resistances 180. Note that the same reference numerals are assigned to the same or similar components described above, and a description there of is omitted.

The power supply wiring 169 is, for example, a wiring that supplies a power supply electric potential Vss, and extends from the end, which is connected to the FPC 16, to be connected to the V system circuit 156 and the H scanner 152. Note that the electric potential Vss is, for example, supplied through the V system circuit 156 to the V scanner 154 and supplied through the H scanner 152 to the circuit 158.

The dummy wiring 170 is connected through the resistance 180 to the power supply wiring 169, and extends around the panel and then is connected through the other resistance 180 to the power supply wiring 169 again. Here, the dummy wiring 170 is located on the outermost periphery than various wirings of the peripheral circuit 150. The dummy wiring 170 surrounds the scanners 152, 154, the V system circuit 156, the circuit 158, and the like. The dummy wiring 170 extends along the outer periphery of the substrate to form a closed loop in the liquid crystal panel 12B.

The protective resistances 180 have a resistance value of, for example, 10 kΩ to 10 MΩ. The protective resistances 180 may be, for example, formed by using a silicon film.

According to the above configuration, even when static electricity enters from the outer peripheral portion of the translucent conductive film 208 over the side face of the support substrate 202 to the dummy wiring 170, which is the outermost wiring of the first substrate 100, the static electricity is consumed in the protective resistances 180. In addition, even when static electricity entering the translucent conductive film 208 causes fluctuation in electric potential of the dummy wiring 170 due to coupling, the fluctuation in electric potential is consumed by the protective resistances 180. For this reason, the entered static electricity is suppressed from being transmitted to a circuit element, such as the scanner 152. Thus, electrostatic discharge resistance is improved.

In the liquid crystal panel 12C as exemplified in FIG. 5, the peripheral circuit 150 includes, in addition to the above configuration exemplified in FIG. 4, a power supply wiring 172 and a protective resistance 182. The power supply wiring 172 and the protective resistance 182 are arranged inside the above closed loop portion of the dummy wiring 17 in the liquid crystal panel 12C. Note that the same reference numerals are assigned to the same or similar components described above, and a description thereof is omitted.

The power supply wiring 172 is a wiring that supplies a power supply electric potential used in the V scanner 154 and in the circuit 158. Note that the power supply electric potential may be an electric potential that is generated in the liquid crystal panel 12C, or may be an electric potential that is supplied from the external circuit 18 (see FIG. 1), or the like. The power supply wiring 172 passes through the V scanner 154 and extends along the outer periphery of the substrate, and then is connected through the protective resistance 182 to the circuit 158. The protective resistance 182 has a resistance value of, for example, 10 kΩ to 10 MΩ. The protective resistance 182 may be, for example, formed by using a silicon film.

The circuit 158 in the liquid crystal panel 12C uses the above power supply electric potential that is supplied by the power supply wiring 172 as a control signal. For example, the circuit 158 may be a signal processing circuit, a detection circuit, or the like, that is shared by the H scanner 152 and the V scanner 154. When the power supply electric potential is supplied through the power supply wiring 172, the circuit 158 is switched to a circuit for the V scanner 154. When no power supply electric potential is supplied, the circuit 158 is switched to a circuit for the H scanner 152. The thus switching may be, for example, achieved by using a switching element, such as a MOS (Metal Oxide Semiconductor) transistor, and the power supply wiring 172 is connected to a control terminal of the switching element, that is, for example, the gate of the MOS transistor.

Particularly, the protective resistance 182 is connected in the power supply wiring 172 in a midway of the path from the V scanner 154 to the control terminal, and the protective resistance 182 is provided upstream of the control terminal.

According to the above configuration, even when static electricity entering the translucent conductive film 208 causes fluctuation in electric potential of the power supply wiring 172 due to coupling, the fluctuation in electric potential is consumed by the protective resistance 182. In addition, even when static electricity enters from the outer peripheral portion of the translucent conductive film 208 over the side face of the support substrate 202 to the power supply wiring 172 of the first substrate 100, the static electricity is consumed in the protective resistance 182. For this reason, the entered static electricity is suppressed from being transmitted to the control circuit of the switching element. Thus, electrostatic discharge resistance is improved.

Here, in light of the evaluation that static electricity tends to be transmitted to a wiring that extends along the outer periphery of the substrate, electrostatic discharge resistance is reliably improved by connecting the protective resistances 180, 182 to the wirings 170, 172, respectively.

In addition, the wirings 170, 172 to which the protective resistances 180, 182 are connected and the dummy wiring 168 may be variously combined, and, thereby, it is possible to further improve electrostatic discharge resistance. Furthermore, the dummy wiring 168 and the wirings 170, 172, to which the protective resistances 180, 182 are connected, are effective against static electricity that enters the first substrate 100 without passing through the translucent conductive film 208.

Moreover, the above description exemplifies the FFS mode in which the electrodes 116, 118 that drive the liquid crystal 302 are laminated through the insulating film 112. However, it may be configured as an IPS mode in which both electrodes 116, 118 are arranged in the same layer (for example, on the insulating film 112). When in the IPS mode, for example, the electrodes 116, 118 having a comb-shaped pattern are arranged so that the comb-shaped portions are alternately meshed with each other. In addition, the above configured liquid crystal display device 10 may be applied to a liquid crystal display device, such as a TN (Twisted Nematic) mode, in which the common electrode 116 is opposed to the pixel electrodes 118 through the liquid crystal 302.

What is claimed is:

1. A liquid crystal display device comprising:
    a first substrate having a side and including pixel electrodes, a peripheral circuit, at least one common electrode, and a dummy wiring, the peripheral circuit and the dummy wiring being provided outside a pixel area in which the pixel electrodes are arranged, the peripheral circuit being arranged along the side of the first substrate;
    a second substrate that includes a translucent conductive film provided at an opposite side of the second substrate to a side where the liquid crystal is present; and
    liquid crystal through which the second substrate is opposed to the first substrate, wherein
    the peripheral circuit includes a common wiring supplying a common electric potential to the at least one common electrode, the common wiring being separate from the dummy wiring,
    the dummy wiring is located close to an outermost edge of the first substrate,
    the dummy wiring is made of a continuous metal layer surrounding the pixel area and peripheral circuit to ground the static electricity,
    the dummy wiring is located between the peripheral circuit and the outermost edge of the side at which the peripheral circuit is positioned and is not electrically connected to the peripheral circuit, the dummy wiring is connected to a ground potential outside the first substrate and the dummy wiring surrounds the peripheral circuit on at least three sides of the first substrate, and
    wherein the dummy wiring is provided to discharge electric potential rise on the first substrate that occurs due to coupling with electric potential rise of the translucent conductive film on the second substrate.

2. The liquid crystal display device according to claim 1, wherein the translucent conductive film is maintained at a predetermined electric potential.

3. The liquid crystal display device according to claim 2, wherein the dummy wiring is positioned at an outermost periphery of the substrate outer edge side of the first substrate.

4. The liquid crystal display device according to claim 3, wherein the dummy wiring does not intersect with the periphery circuit.

5. The liquid crystal display device according to claim 4, the dummy wiring surrounds the outer periphery of the side of the first substrate and does not constitute a closed path, both ends of the dummy wiring are extended to a portion that connects with the external wiring and are connected to the ground potential of the external circuit through the external wiring.

6. The liquid crystal display device according to claim 1, wherein the ground potential outside the first substrate is separate from a ground potential of the liquid crystal display device.

7. The liquid crystal display device according to claim 1, wherein the dummy wiring has two ends, wherein each end is connected to the ground potential outside the first substrate.

8. The liquid crystal display device according to claim 1, wherein the dummy wiring surrounds all of the at least three sides of the first substrate and surrounds at least part of a fourth side.

9. A liquid crystal display device comprising:
    a first substrate including pixel electrodes, a peripheral circuit, at least one common electrode, and a dummy wiring, the first substrate having a side with an edge and a pixel area, the peripheral circuit and the dummy wiring being provided outside of the pixel area, the pixel electrodes being arranged at the pixel area, the peripheral circuit being arranged along the side of a first substrate;
    a second substrate having a first side and a second side opposite to a first side, the second substrate including liquid crystal provided at the first side of the second substrate and a translucent conductive film provided at a second side of the second substrate, the liquid crystal being disposed between the second substrate and the first substrate, the dummy wiring being positioned between the peripheral circuit and the edge of the side of the first substrate and is not electrically connected to the peripheral circuit, the dummy wiring being connected to a ground potential outside the first substrate; wherein:
    the peripheral circuit includes a common wiring supplying a common electric potential to the at least one common electrode, the common wiring being separate from the dummy wiring,
    the dummy wiring is located close to an outermost edge of the first substrate,
    the dummy wiring is made of a continuous metal layer surrounding the pixel area and peripheral circuit to ground the static electricity, and the dummy wiring surrounds the peripheral circuit on at least three sides of the first substrate in a plain view, and
    wherein the dummy wiring is provided to discharge electric potential rise on the first substrate that occurs due to coupling with electric potential rise of the translucent conductive film on the second substrate.

* * * * *